(12) United States Patent
Simopoulos

(10) Patent No.: US 6,452,818 B1
(45) Date of Patent: Sep. 17, 2002

(54) SELF DRIVEN ACTIVE CLAMP

(76) Inventor: Anastasios A. Simopoulos, 2 Otis Pratt La., Middleboro, MA (US) 02346

( * ) Notice: Subject to any disclaimer, the term of this patent is extended or adjusted under 35 U.S.C. 154(b) by 0 days.

(21) Appl. No.: 09/939,875

(22) Filed: Aug. 27, 2001

(51) Int. Cl.[7] .............................................. H02M 3/335
(52) U.S. Cl. ................................. 363/21.06; 363/21.04
(58) Field of Search ........................ 363/16, 20, 21.01, 363/21.04, 21.06, 21.14, 95, 97, 131

(56) References Cited

U.S. PATENT DOCUMENTS

| | | | | |
|---|---|---|---|---|
| 4,441,146 A | | 4/1984 | Vinciarelli | |
| 5,726,869 A | * | 3/1998 | Yamashita et al. | 363/21 |
| 5,734,563 A | * | 3/1998 | Shinada | 363/21 |
| 6,278,621 B1 | * | 8/2001 | Xia et al. | 363/21.06 |
| 6,288,920 B1 | * | 9/2001 | Jacobs et al. | 363/17 |
| 6,304,463 B1 | * | 10/2001 | Krugly | 363/21.06 |

* cited by examiner

Primary Examiner—Matthew Nguyen
(74) Attorney, Agent, or Firm—Cesari and McKenna, LLP; Edwin H. Paul, Esq.

(57) ABSTRACT

A forward DC/DC converter with an active clamp that is driven directly from the primary or secondary of the transformer. The clamp may be on the input or the output circuit and may be of either N-type ot P-type MOSFETs or of bipolar transistors.

4 Claims, 12 Drawing Sheets

SELF DRIVEN ACTIVE CLAMP

TECHNICAL FIELD OF THE INVENTION

This invention relates to switching-type power converters and in particular forward and flyback-type converters that have synchronous output rectifiers. Converters with self-synchronized rectifiers refer to MOSFET devices used as rectifiers. The gates of these devices are driven by the secondary voltage signal of the power transformer. The use of so-called self-driven synchronous rectifiers in buck-driven converters is limited by the inefficiency of these rectifiers. The reset voltage for the transformer core in forward converters de-signed without an active clamp limits the conduction time of one of the MOSFETs in the synchronous rectifiers, thus pre-venting the converter from operating at maximum efficiency.

BACKGROUND OF THE INVENTION

In the converter shown in FIG. 1A, a conventional forward topology of the prior art with an isolating power trans-former is combined with a self-synchronized synchronous rectifier. In such a rectifier, controlled devices are used with the control terminals (gates) being driven by the secondary winding of the power transformers.

A DC input voltage, $V_{IN}$, at input 100, is connected to the primary winding 106 of the power transformer by a MOSFET power switch Q1 104. The secondary winding 108 is connected to an output lead 118 through an output filter inductor 114 and a synchronous rectifier including the MOSFET rec-tifier devices Q2 110 and Q3 112. Each rectifying device includes a (parasitic) body diode 120 and 122 respectively.

With the power switch Q1 104 conducting, the input volt-age is applied across the primary winding 106. The second-ary winding 108 is oriented in polarity to the primary voltage with a current flow through the inductor 114, the load is connected to the output lead 118 and back through the MOSFET rectifier Q2 110 to the secondary winding 108.

The current path provided by the conduction of the MOSFET rectifier Q3 112 maintains continuity of the current flow in the inductor 114. An output filter capacitor 116 shunts the output of the converter.

The gate drive signals for the MOSFET rectifiers are pro-vided by the voltage appearing across the secondary winding 108.

In FIG. 1B, the voltage and current waveforms of the converter from FIG. 1A are shown graphically. Referring to FIG. 1B, as the pulse width modulator (PWM) 102, turn off MOSFET 104 disconnecting the primary winding 106 of the power transformer.

The drain voltage of Q1 140 rises and due to parasitic capacitance of the input and output, assumes a sinusoidal wave-form from t0 to t1. During this period, t0–t1, the power transformer core resets itself (reset period). The top or sinusoidal portion of 140 appears as the drain voltage of Q2 and the gate of Q3 shown as VDQ2/VGQ3 in 142. During the reset period, t0–t1, IQ2 146 drops to zero and all the current through the inductor 114 is supplied by Q3 shown in 148. Specifically IQ3 148 assumes its maximum at t0 and then linearly decreases from t0 to t1. From t1 to t2, both MOSFET rectifiers Q2 and Q3 are off because the gate driving signals of both Q2 144 and Q3 142 are zero. The period from t1 to t2 is a so-called "dead time" period in which no power transfer or core resetting takes place in the power transformer.

At t1(t) to t2, the inductor current shown in 150 continues to flow through the body diodes of Q3 122 and Q2 120. Most of the inductor current flows through 122 and a small portion through 120 due to the fact that the secondary winding of the power transformer is in series with diode 120. The forward voltage drop of the MOSFET body diodes is close to 1 volt, which is very high when compared to 0.1 volts when the MOSFET is on.

The dead time period, t1–t2, increases with increasing in-put voltage line $V_{IN}$. This large increase of the dead time, which assumes its maximum value at maximum input voltage $V_{IN}$, results in the synchronous rectifier of FIG. 1 offering its worst efficiency at maximum input voltage.

At t2 the gate voltage of Q2 110 is zero, the secondary momentarily forward biases the body diode 120 of Q2 110 allowing the secondary current to flow. As soon as the dotted end of secondary 108 exceeds the gate threshold voltage of Q2 110, the body diode is short circuited by the channel of Q2 110 allowing all the secondary current to go through the channel.

From t2 to t3, Q1 104 turns on again (the power transfer period of the conversion cycle) and Q2 110 turns on con-necting the secondary 108 of T1 through inductor 114 to the output terminal 118.

During t2–t3, energy is stored at the output inductor 114, the charge is restored at output capacitor 116 and all the load current is carried through Q2 110. The gate driving signal for Q2 110 is shown in 144, which is the inverted lower part of the drain waveform of Q1 140. The synchronous rectifiers driven directly from the secondary of the forward converter shown in FIG. 1A prohibit the converter from achieving maximum possible efficiency due to the operating nature of the unclaimed forward converter.

Even though the self-driven synchronous rectifiers in the forward converter are simple and low-cost, the inherent low efficiency reduces the maximum possible power density and the converter's reliability making the converter unsuitable for high-power density. (Therefore there is a need for an improved version of a forward unclamped converter with synchronous rectifiers.)

Forward converter designs utilizing an "active clamp" to clamp the primary voltage generated during the reset period of the transformer core, when the converter must operate over more than 2:1 input voltage range, at high input voltage also enter into a dead time period.

Forward converters with an active clamp require more complex timing circuitry and additional power MOSFETs. Also, as it is pointed above when the converter operates over a wide input range, the self-driven synchronous rectifiers will encounter a dead time period.

An active clamp circuit is described by Vicor Corporation in its U.S. Pat. No. 4,441,146.

SUMMARY OF THE INVENTION

This invention combines a storage capacitor and control circuitry for charging and discharging the storage capacitor. The capacitor provides energy that switches or resets a transformer winding of a forward DC/DC converter. The drive signals for the control circuitry are taken from trans-former windings. In virtually all DC/DC converters, a pulse width modulator signal drives an FET switch in the primary of a transformer. When that FET switch is turned OFF, the drain of the FET, and transformer connection to that primary switch, rises and through drive circuitry turns stores mag-netic energy from the transformer in the storage capacitor.

After the capacitor has reached its highest level the capacitor will start to discharge through a path provided, and thereby turns on a solid state switch that further discharges the storage capacitor through the transformer thereby resetting the transformer core. When the primary switch turns back ON, the solid state switch is turned OFF via the drive circuit and the capacitor is further discharged.

Bipolar or N, or P type FET transistors may be used in the control circuitry, as is known in the art.

The solid state switch is turned ON after the switch in the primary is turned OFF, and the solid state switch is turned OFF after the primary switch is turned ON.

DESCRIPTION OF DIAGRAMS

For a more complete understanding of the present invention and the advantages it offers, please reference the following descriptions with the accompanying drawings.

DETAILED DESCRIPTION OF PREFERRED EMBODIMENTS

Figure 1A:
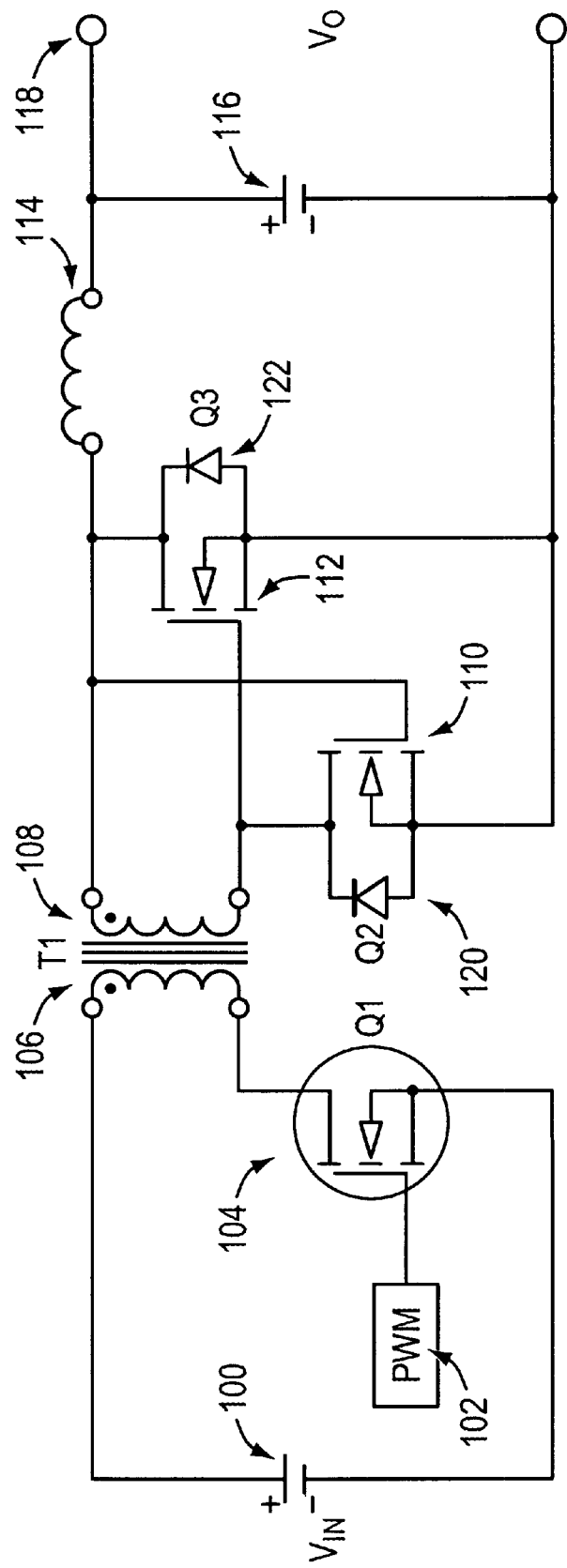
FIG. 1A is a schematic of a forward-type converter of the prior art, but employing a synchronous rectifier.
Figure 2A:
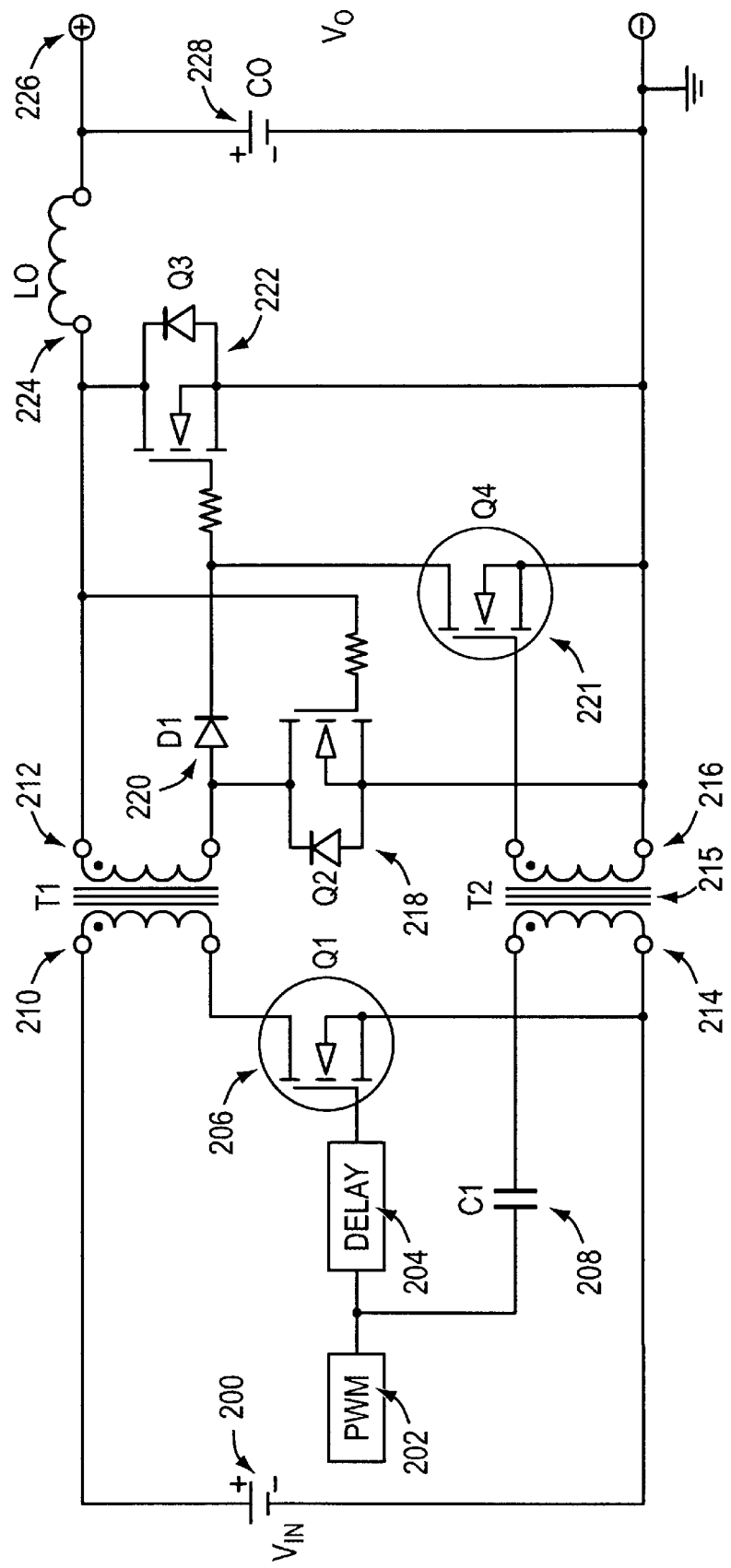
FIGS. 2A & 2B are the schematic and associated waveforms, respectively, for describing the present invention.•
Figure 2B:
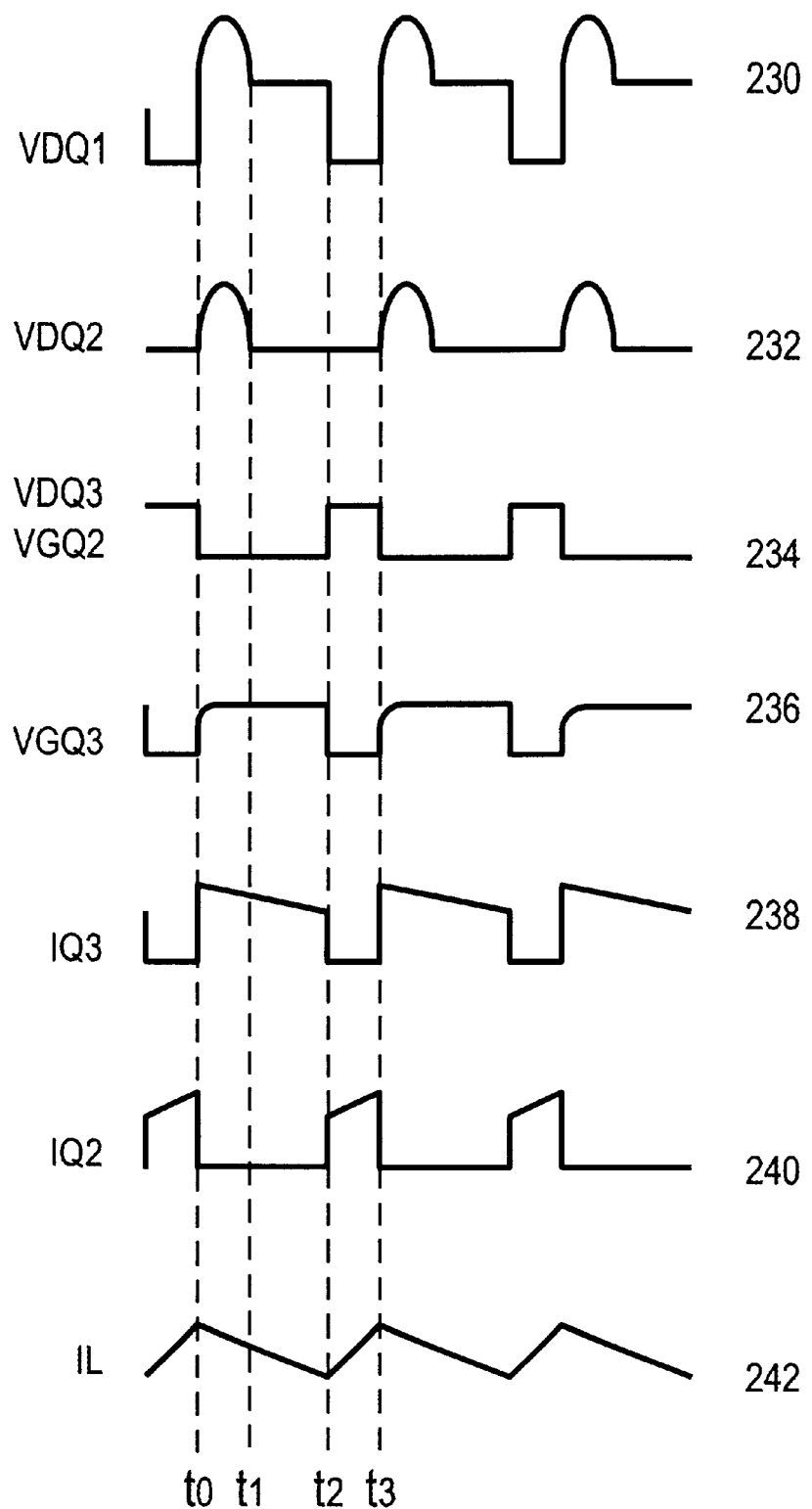

FIGS. 2A & 2B present a forward converter with semi-selfdriven synchronous MOSFET rectifiers. The circuit is derived from the circuit in FIG. 1A by adding 4 discrete low-cost parts D1 220, Q4 221, T2 215, C1 208 and a delay circuit 204. The voltage and current waveforms for the for-ward converter in FIG. 2A are shown graphically in FIG. 2B. The operation of the circuit in FIG. 2A is the same as described for the circuit in FIG. 1A with the exception of the driving signal for the synchronous MOSFET rectifier Q3 222.

Referring to both FIGS. 2A & 2B, at t0 the power transformer T1 begins its core reset cycle. At the same time, the gate driving signal of Q2 218 goes low (waveform 234), the drain of Q2 218 (waveform 232), starts going high and through D1 220 charges the gate to source capacitor of MOSFET Q3 222 turning it on.

Diode D1 220 and the parasitic gate to source capacitance of Q3 222 act as a voltage peak detector for the drain voltage of Q2 218 waveform 232. The gate of Q3 222 will remain charged (Q3 on) during the reset and the dead time period up to a few nanoseconds prior to t2 (power transferring period of T1). At t2 minus 50–100 ns the gate charge of Q3 222 is removed by the low-power MOSFET Q4 221. The secondary 216 of the pulse transformer 215 drives the gate of Q4 221. The primary 214 of T2 215 is AC-coupled to the output of the PWM 202 through capacitor C1 208. As the new power transferring cycle begins (t2 to t3), the output of PWM 202 goes high and is delayed by a small amount of time through delay 204 50–100 ns before arriving at the gate of Q1 206.

Assuming the propagation delay through C1 208 and T2 215 is equal to that of power transformer T1, the delay of 204 must be equal to that of Q4 221 plus Q3 222. The delay of 204 is needed to turn Q3 222 off just prior to t2 or the beginning of the power transfer period t2 to t3. To those familiar with the art, it should be obvious that the delay 204 can be implemented by adding a small series resistor from the output of PWM 202 to the gate of Q1, a fixed delay buffer or a combination of both. The parasitic gate to source capacitor with the series-added gate resistor forms a low-pass filter thus delaying the output of PWM 202.

The semi-self-driven synchronous MOSFET rectifier presented in FIG. 2A and described above forces Q3 to re-main on during the reset and the dead time periods of the power transformer in a conventional (without active clamp) forward DC/DC converter. The body diodes of the synchronous MOSFET rectifier are off most of the time and the efficiency is improved by 8% to 9% in comparison to the self-driven converter given in FIG. 1A.

Referring to FIG. 2B, the current waveforms of Q2 218 and Q3 222 are given as IQ2 240 and IQ3 238, respectively. By comparing the current waveforms given in FIG. 1B for the self-driven synchronous MOSFET rectifiers of IQ2 and IQ3 to the same current waveforms given in FIG. 2A for the present invention, it is obvious the current discontinuities during the dead time period (t1–t2) due to the body diode conduction are removed from the current waveforms in FIG. 2B.

NOTE: If the $I_O.R$ drop in the transistor channel is higher than the forward drop of the parasitic diodes, these diodes will be forced to conduct.

Figure 3:
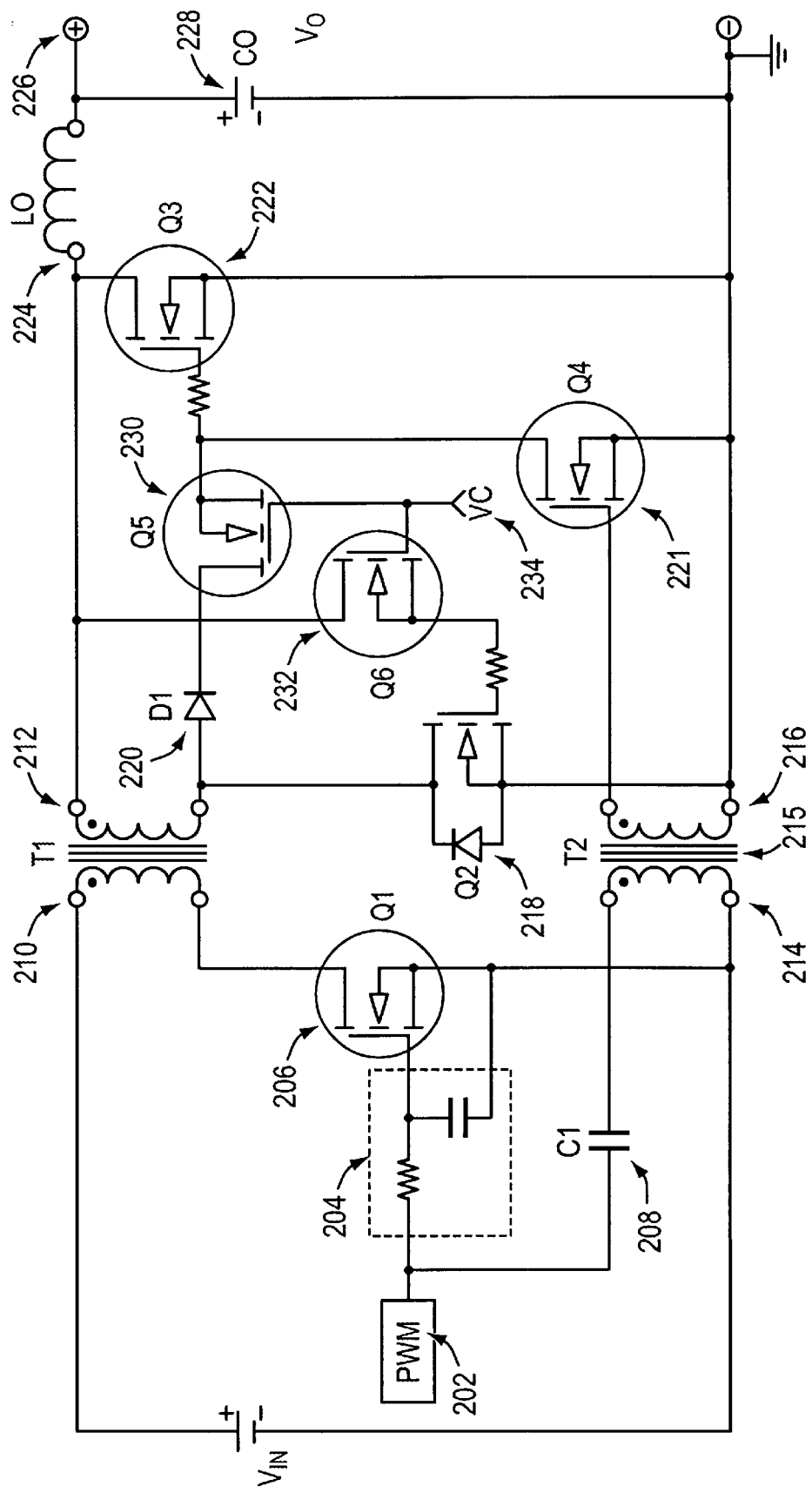
FIG. 3 is the schematic of the present invention implemented with gate voltage limiters for the synchronous rectifiers.

In FIG. 3, one of the preferred embodiments of the invention is shown. Two low-power MOSFETs are used as gate voltage limiters for Q2 218 and Q3 222, in case the secondary voltage of T1 212 exceeds the maximum gate voltage of the MOSFET synchronous rectifiers Q2, Q3. Specifically Q5 230 is inserted between the cathode of D1 220 and the gate resistor of Q3 222. The drain terminal of Q5 230 is connected to the cathode of D1 220; the source of Q5 230 is connected at the node of the drain of Q4 221 and the gate resistor of Q3 222. The gates Q5 230 and Q6 232 are driven from a control voltage VC 234. Voltage limiter Q6 232 has its source connected to the series gate resistor of Q2 218 and its drain of the node connecting the secondary of the power transformer T1 212 to the drain of Q3 222 and inductor LO 224. The control voltage VC 234 can be generated by a secondary winding in T1 or LO and can be adjusted to any volt-age level (be it DC or pulsating). Also Q5 230, Q6 232 can be bipolar NPN Darlington transistors, such as the Philips BST50, or single NPN with parallel diode oriented as the body diode in the N channel MOSFETs.

A 50-watt converter based on the design given in FIG. 3 was constructed in a 27".1".0.4" case using the following key components: • PWM—UCC3807D 8-pin current mode; T1 Core—UG42011 Magnetics with 0.120" window; LO Core—Philips 3F3 material; T2 Core—Toroid 40502-TC Magnetics W or H material; Q2, Q3—0.005 ohm on channel resistance.30VDS MOSFET I.R. (International Rectifiers); D1—1A Schottky 60V diode; Q4—VN 3205 Supertex; Q5, Q6—IRF 7341 Dual N Channel MOSFET.

A multi-layer (20 layer) printed circuit board is used for the power transformer T1 and inductor LO winds, while the two outer surfaces are populated with the SMD components.

A 3.3$V_{OUT}$ 15-amp converter using 48$V_{IN}$ was tested. Its efficiency was 89% and by short-circuiting D1, the self-driven synchronous MOSFET rectifier design in FIG. 1A was implemented and tested to offer efficiency of 81%. The multi-layer board is connected to the load and $V_{IN}$ through edge pins, which can be surface mounted or though hole.

Figure 4:
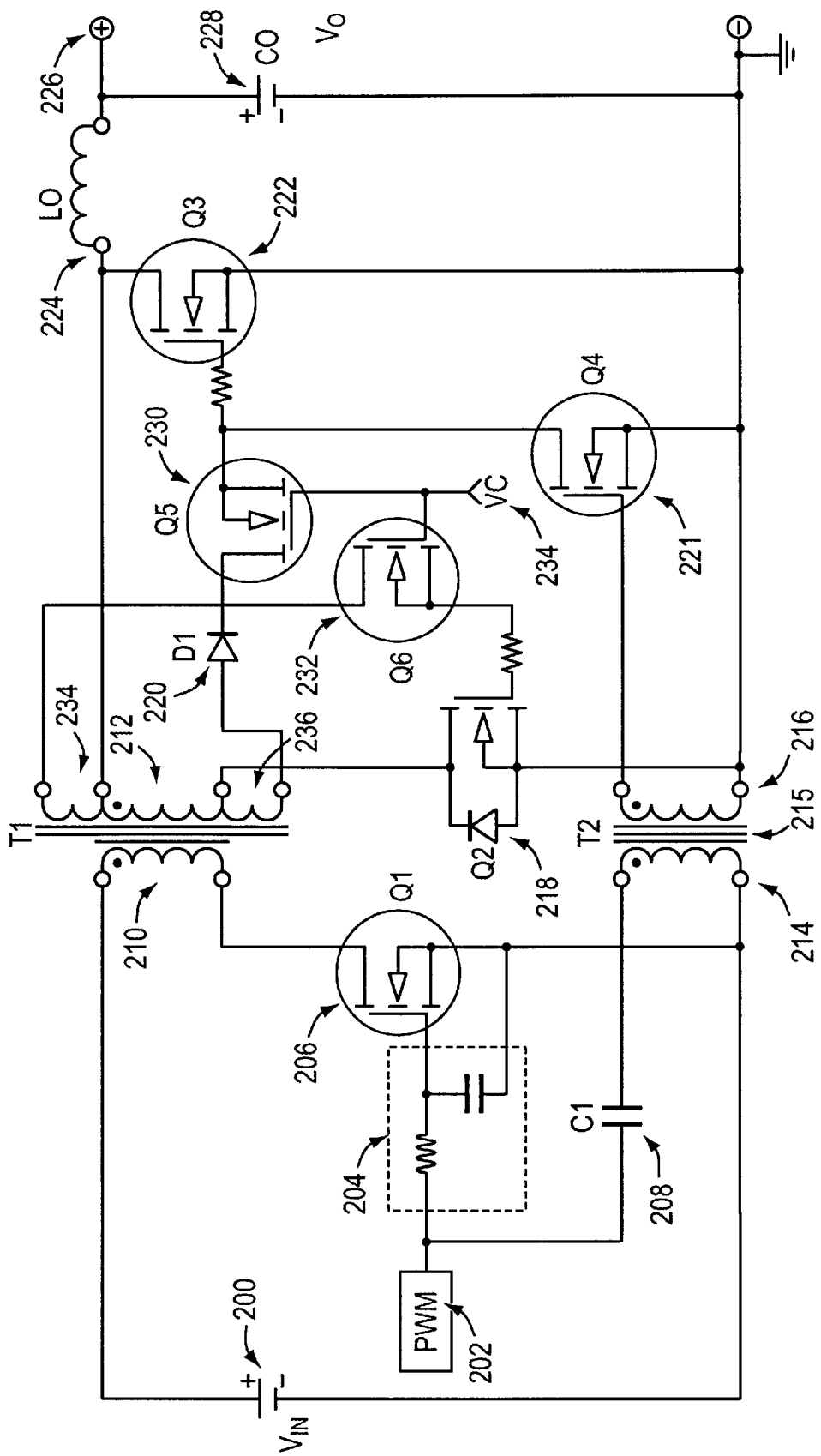
FIG. 4 is the schematic of the present invention with gate voltage limiters (FIG. 3) specifically designed for low output voltage or wide input voltage ranges with a boost in the secondary synchronous rectifier driving voltage.

For output voltages VO below 2 volts, the embodiment in FIG. 4 can be used. In FIG. 4, two auxiliary secondary winding 234, 236 connected in series with the power secondary 212 are used to generate the needed gate voltages for Q3 222, Q2 218.

The voltage limiters Q5 230, Q6 232 can be removed if the input voltage to the converter varies only by a ratio of 2:1 (36 to 72 volts (High line $V_{IN}$/Low line $V_{IN}$)). Both designs in FIGS. 3 and 4 offer wide input voltage range and minimum parts count, which results in low cost.

Figure 5A:
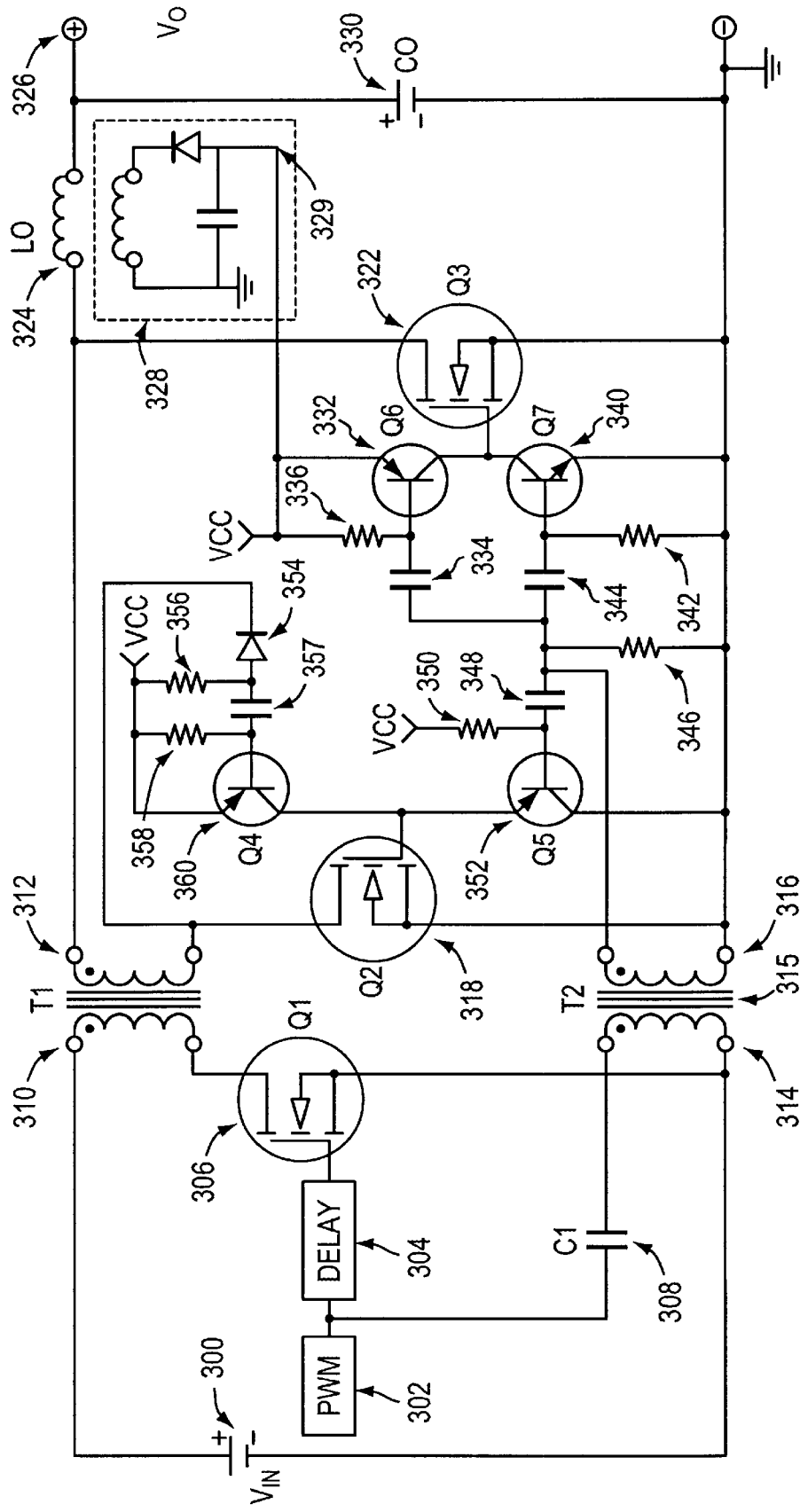
FIGS. 5A & 5B are schematics and associated waveforms, respectively, of the present invention with overlapping synchronous rectifiers driving signal independent delay control without voltage limiters or secondary boosting windings.•
Figure 5B:
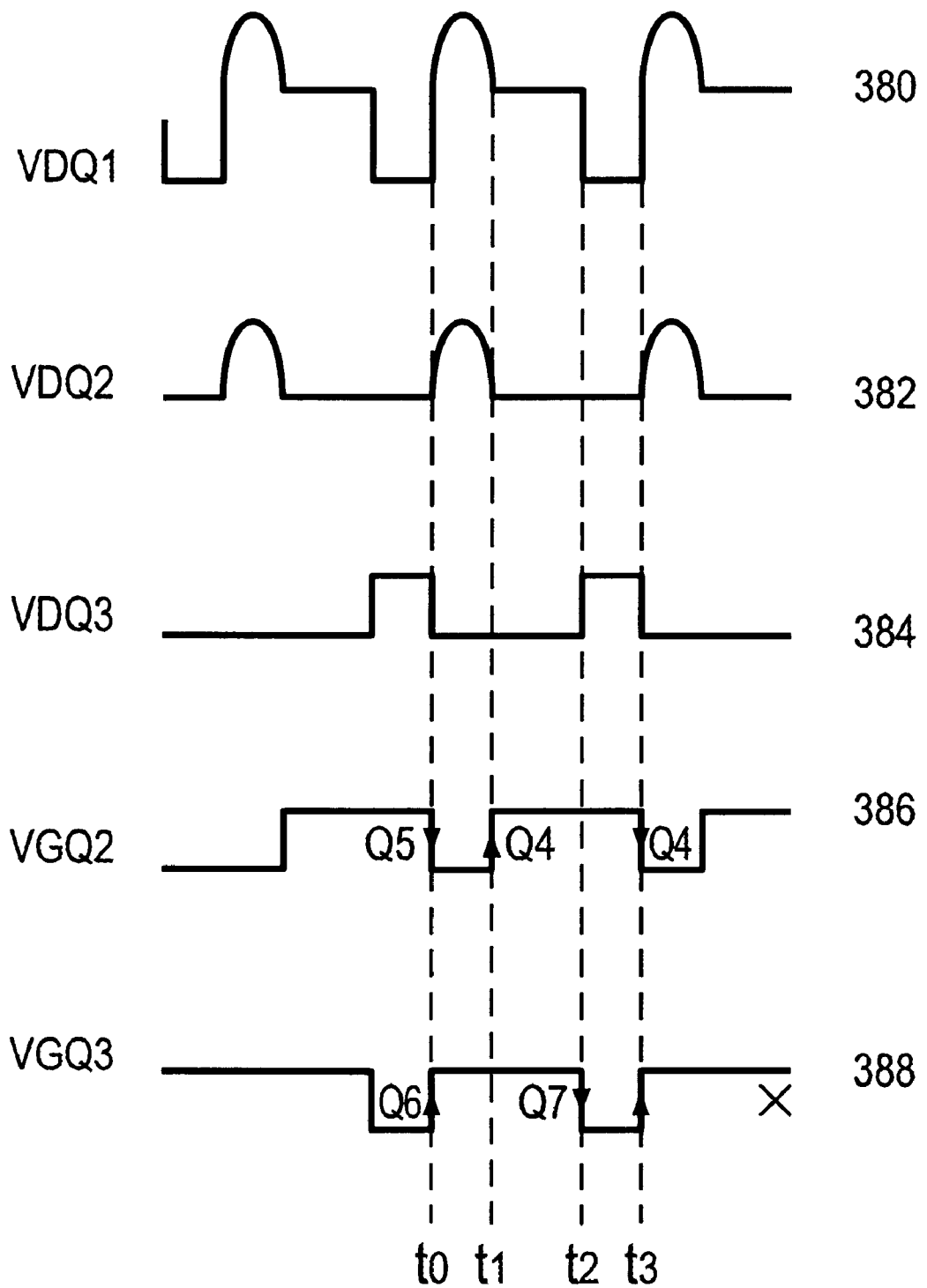

A schematic and timing waveform is given in FIGS. 5A & 5B. The converter with synchronous MOSFET rectifiers Q2 318, Q3 322 is a semi-self-driven synchronous rectifier forward converter where the gate driving signal is generated by combining input and output control signals.

Bipolar transistors Q4, Q5, Q6, Q7 are used as edge trigger devices to charge and discharge the gate to source capacitance of the synchronous rectifiers Q2 318, Q3 322. Specifically, at t0 the output of PWM 302 goes low as it is delayed by delay 304 while it propagates through C1 308 and T2 315 and arrives at the node formed by capacitors 348, 344 and resistor 346.

The negative-going edge of the PWM 302 pulse through capacitor 348 momentarily turns on Q5 352 which in turn discharges Q2 318 and turns it off at the same time Q1 is turned off by the same PWM pulse going through delay 304. Also, at t0, the same negative pulse edge of the PWM momentarily turns on Q6 332 through capacitor 334 turning on Q3 322. Both PNP transistors Q5 352 and Q6 332 must be able to carry the needed current for discharging and charging the synchronous MOSFET rectifier's parasitic capacitance such as gate to source, drain to gate, etc.

At t1, the drain voltage of Q2 318 (FIG. 5B VDQ2 382) drops below $V_{CC}$. Q2 318 is turned on again by the negative-going edge of its drain voltage waveform 382 through capacitor 357 and PNP transistor Q4 360.

Figure 1B:
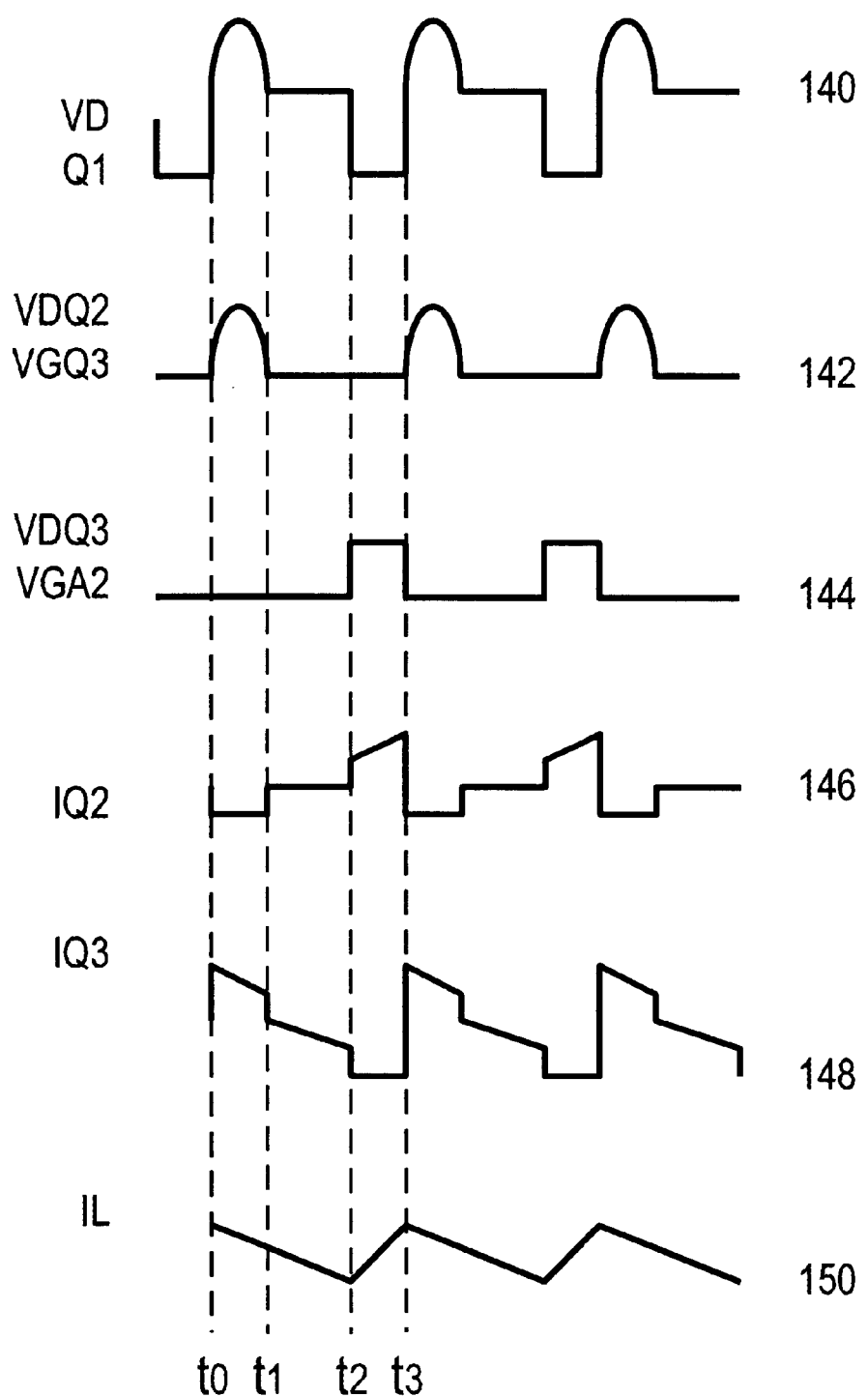
FIG. 1B is the voltage and current waveforms for the forward converter presented in FIG. 1A.

The diode 354 prevents any current flow back to its anode node when VDQ2 382 exceeds $V_{CC}$329. During the dead time period (t1 to t2) both MOSFET rectifiers Q2 318 and Q3 322 are on and both carry the inductor 324 current. The IR drop in Q3 322 is reduced during the dead time period (t1–t2). At t2 the power transferring cycle begins, Q2 318 was turned on at t1 assisting Q3 322 and waits for the next power transferring cycle, which in this case, starts at t2. The momentary turn-on of the body diode of Q2 described for the self-synchronized synchronous rectifiers in FIG. 1A is eliminated. At t2 the positive edge of the output pulse of PWM 302 through capacitor 308, transformer T2 315 and capacitor 344 momentarily turns on Q7 340 and turns off Q3 322.

It should be noted that all the bipolar transistors have an off-state bias and at turn-on the converter will operate through the body diodes of the synchronous rectifiers for a few cycles until $V_{CC}$ reaches voltage levels above the MOSFET rectifiers' threshold voltage.

Even though it was not described herein, the design in FIG. 5A is very flexible. The propagation delay of the output pulse of PWM 302 can be tailored for either the positive or negative edge of the pulse through the R-C resistor networks for each and every bipolar transistor. Base- or gate-series resistors (not shown) can also be adjusted through series a gate resistor in parallel with a small signal-switching diode.

The benefits of the invention in FIG. 5A offers the high-est possible efficiency for an unclamped forward converter. It eliminates the need for gate voltage limiters and has better reliability because it runs cooler. However, it does require more parts and area.

It is also obvious that the pulse transformer T2 315 can be eliminated if input to output isolation is not required. It can be replaced with a high-voltage capacitor diode combination or any other fast-isolation signal buffer. If the bipolar transistor drivers and their associated components can be replaced by an integrated circuit (e.g. an 8-pin IC), its reliability and power density will be further improved.

SELF-DRIVEN ACTIVE CLAMP

In prior art, the active clamp in DC/DC converters have been used to reduce the voltage stress of the primary transistor switch in forward/flyback converters (see references) by allowing the magnetic current to circulate and reset the power transformer core. An additional benefit of the active clamp is the improvement of the efficiency of the converter because of part of the energy required to reset the power transformer core is returned back to the input source powering the converter.

In prior art, the active clamp consists of a power MOSFET connected in series with the storage capacitor. The transistor is driven by a control signal generated from the main control device, pulse width modulator (PWM), located at either in-put or output section of the converter. Depending on the location of the active clamp and the type of MOSFET (N channel, P channel), additional components and specific timing between the PWM main power transistor driving signal and that of the active clamp is required.

The self-driven active clamp (SDAC) offers all the benefits of the prior art with less components, lower cost and higher reliability. As in prior art, the active clamp can be an N channel or P channel MOSFET and be placed at either input or output section of the converter and will operate with any power conversion topology.

Figure 6:
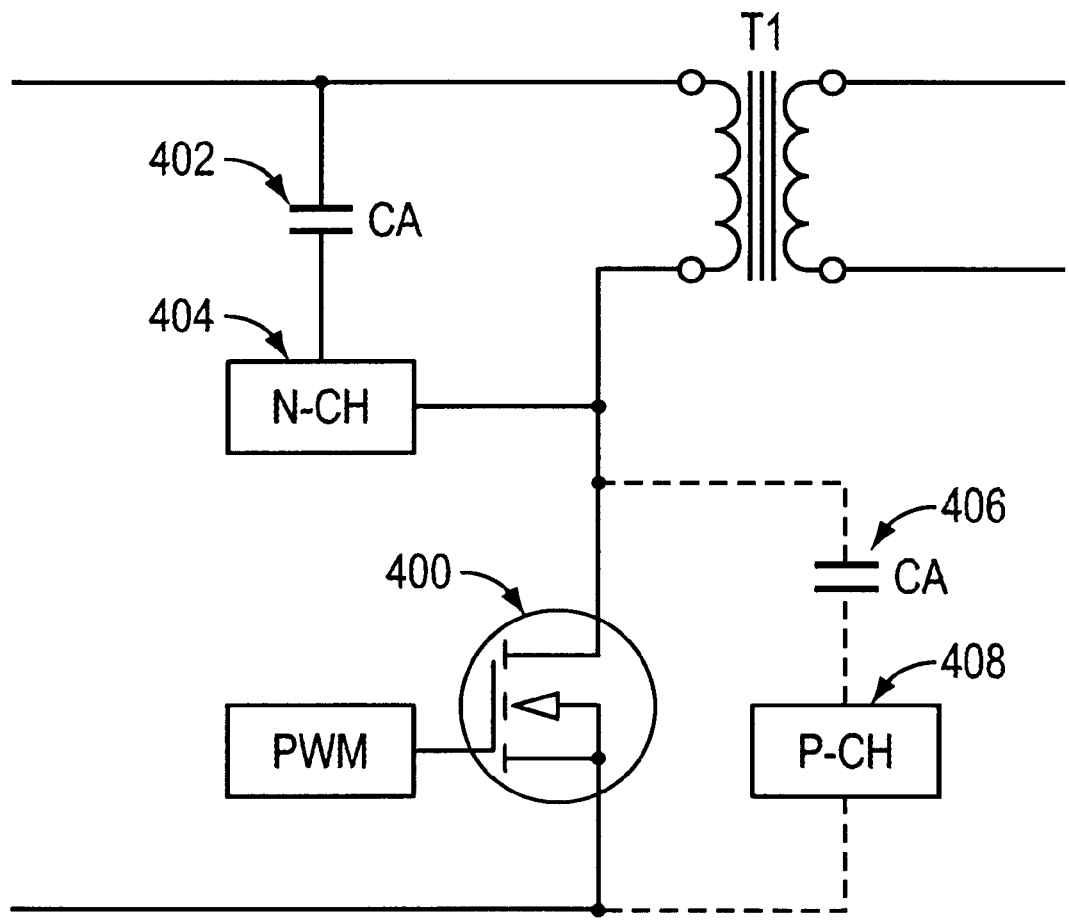
FIG. 6 is a block diagram of a self-driven active clamp utilizing either N or P channel MOSFET.

In FIG. 6, a block diagram is given of both N channel and P channel (dotted line) self-driven clamps. The N channel SDAC 404 and the P channel SDAC 408 are shown as a 2-terminal device connected in series to storage capacitor CA 402 and CA 406, respectively.

Figure 7A:
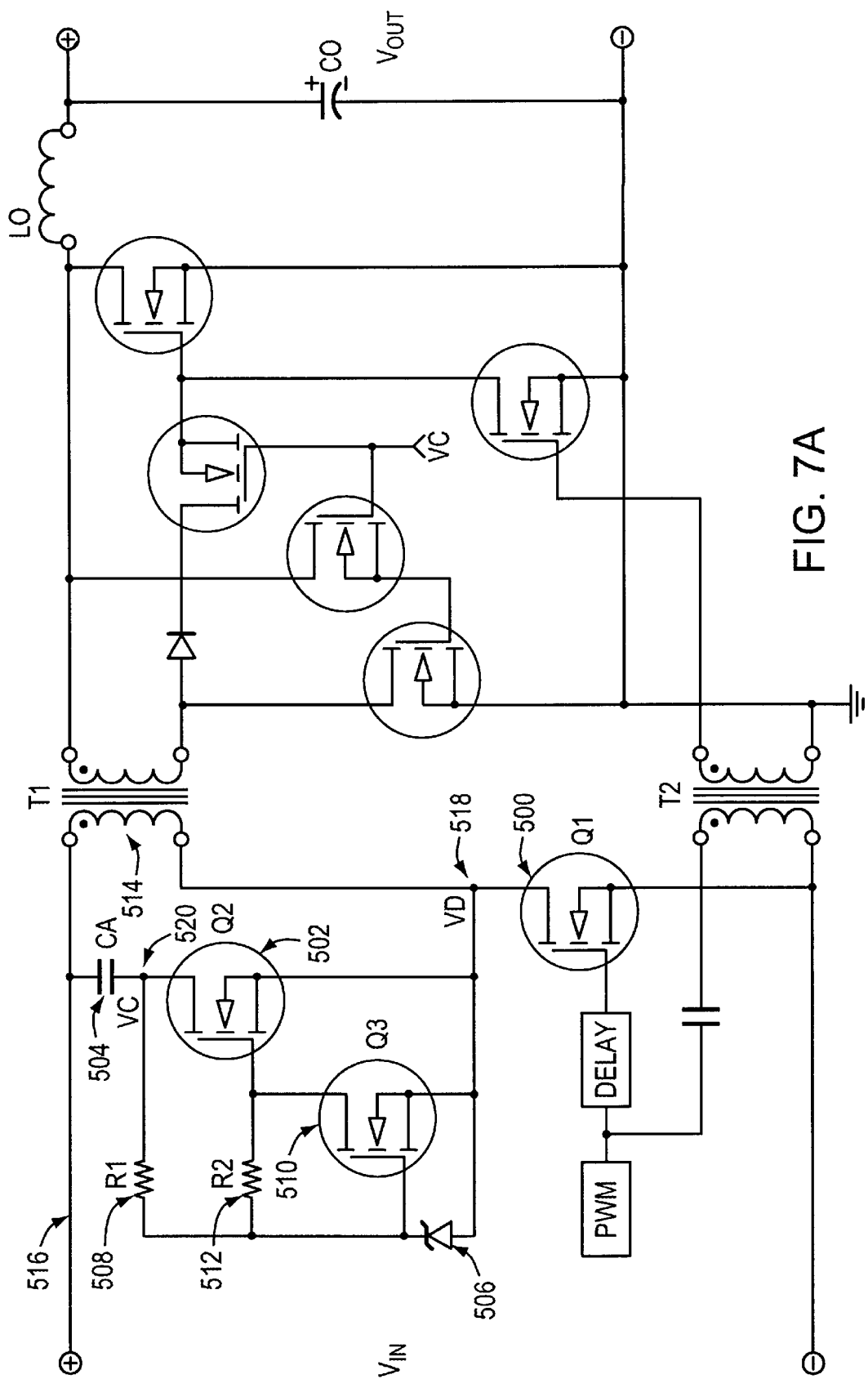
FIGS. 7A and 7B are schematics and associated waveforms of the forward converter with improved synchronous rectification and N channel self-driven active clamp.•
Figure 7B:
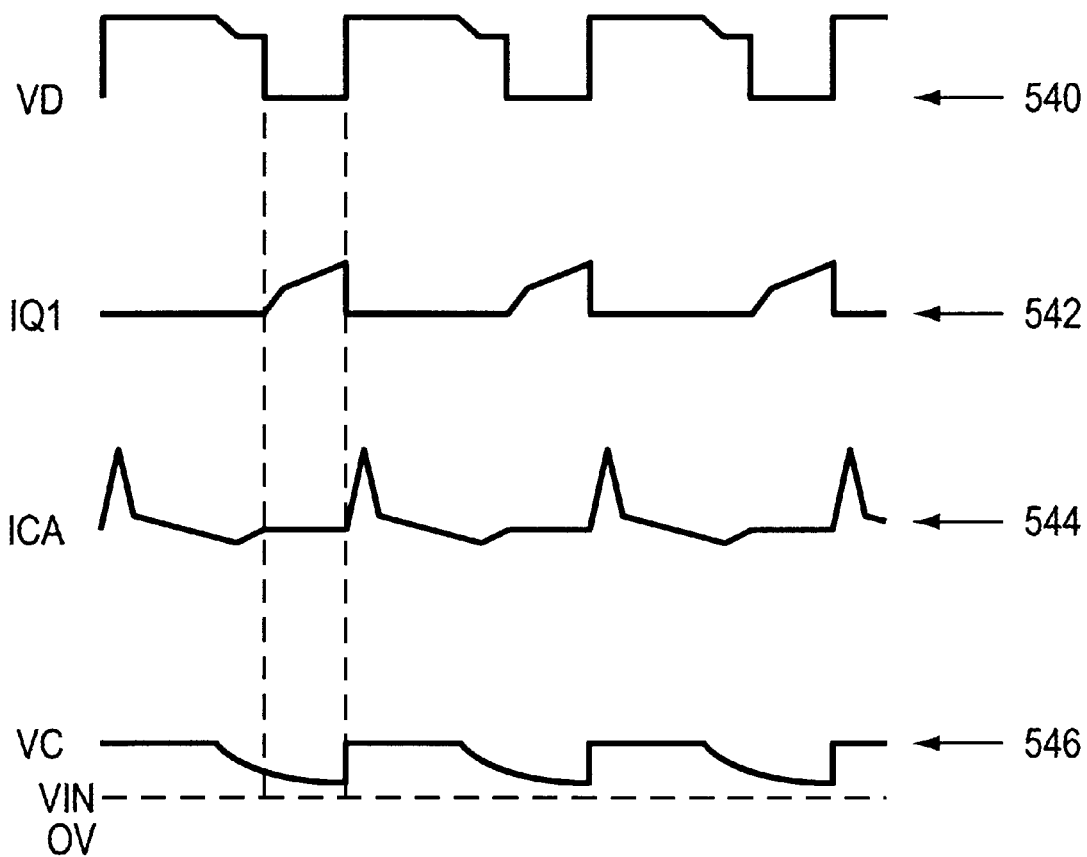

In FIG. 7A, a schematic of an N channel SDAC is given, while in FIG. 7B the associated voltage and current waveforms are presented. Referring to FIG. 7A, the operation of the SDAC can be described as follows: After Q1 500 turns off, the voltage at node VD 518 starts to increase from zero volts. When VD 518 becomes one diode drop more positive than VC 520, the parasitic diode of Q2 502 (not shown) starts charging CA 504. At the same time, the gate to source ca-pacitors of Q2 502 and Q3 510 are charged to VD 518 volt-age, Q2 502 through the parasitic diode of Q3 510 and Q3 through the zener diode 506.

After VC 520 reaches its peak value due to the leakage current path formed by R1 508 and zener 506, current starts to flow from VC 520 back to positive Vin terminal 516 through the primary of T1 514 discharging CA 504. When the threshold of Q2 502 is reached, the channel of Q2 starts to conduct current from CA 504 and resets the core. Transistor Q3 510 turns off Q2 at the end of the resetting period of the transformer core. The zener diode 506 also protects the gates of Q3 510 and Q2 502.

Resistor R2 512 biases the gate of Q2 depending on the input voltage the selected value of CA 504, switching frequency of the converter and the parasitic capacitors of Q2 502 and Q3 510. The bias resistor R1 508, R2 512 are very large compared to the on resistance of Q2 502, Q3 510.

At the beginning of the on period when VD 518 drops to zero, the gate to source voltage of Q3 is clamped by the zener diode 506 turning Q3 510 completely on and Q2 off. The gate to source capacitance of Q3 is also discharged through Q1 500.

During the on time of Q1 510, capacitor CA 504 continues to discharge through R1 and zener diode 506 to ground through Q1 500. During the on period Q3 510 must remain on to keep Q2 502 off. For those familiar with the art, it will be obvious that Q2 502, Q3 510 can be replaced by a bipolar transistor with different bias scheme.

In FIG. 7B, the voltage and current waveforms from FIG. 6A are shown. Specifically, VD 540 is the drain voltage of Q1 500 in FIG. 7A. The current through Q1 500 is given as IQ1 542, the current through CA 504 is given as ICA 544 and the voltage VC 520 is given as VC 546.

Figure 8:
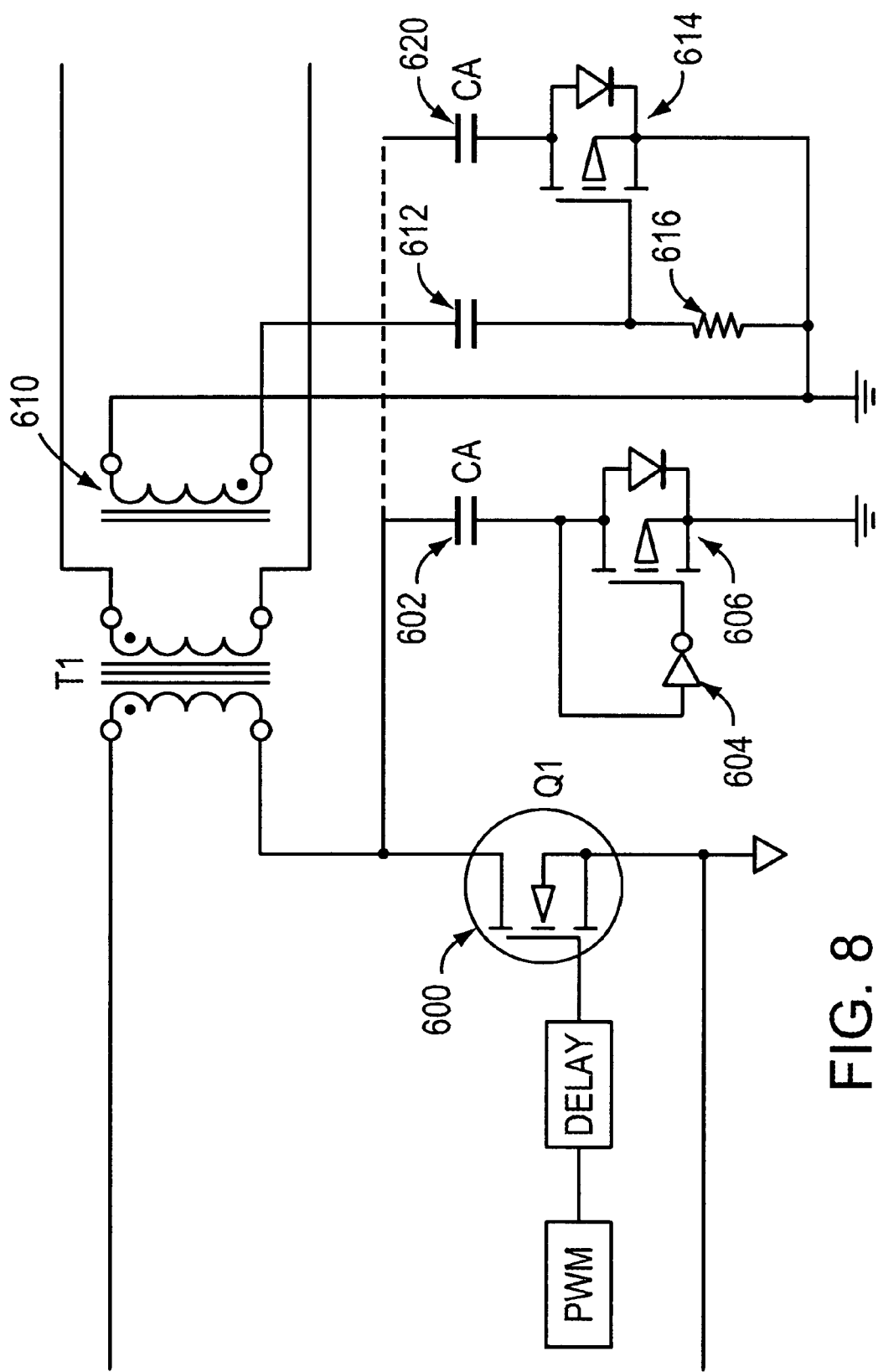
FIG. 8 is a schematic of a two-version P channel self-driven active clamp.

In FIG. 8, two different versions of a P channel SDAC are presented: the first version consists of CA 602 inverter 604 and P channel MOSFET 606 with its parasitic diode shown. The second version consists of CA620 auxiliary winding 610 in series with capacitor 612, resistor 616 and a P channel MOSFET 614 with its parasitic diode shown.

In the first version, the inverter 604, MOSFET 606 and any signal condition required can be implemented on a single semiconductor die. In the second version, the signal inversion for the gate signal drive of MOSFET 614 is accomplished through the auxiliary transformer winding 610 while capacitor 612 and resistor 616 perform the scaling of the gate signal. Both N and P channel SDACs can be used with any of the preferred embodiments of the forward converter with improved synchronous rectification discussed previously (FIGS. 2 through 4).

The major difference between SDAC and the prior art is that the driving signal for the SDAC is not turned on "prior to the on period of the primary switch 10 and closed after this period," as stated in 444146 (page 5, line 36–40). All control signals for SDAC are derived from the signal generated from the primary switch; it is not needed for specific delays, isolation transformers or specialized drivers as is specified in reference 6. It should also be obvious that even if the SDAC allows the converter to assume a dead time period, use of the improved synchronous rectification embodiments outlined here can bring about the realization of a lowcost, high-efficiency forward converter.

What is claimed is:

1. In a forward DC/DC converter where energy is transferred from primary to secondary windings of a transformer during an ON period of a first switch, the first switch driven by a pulse width modulator oscillator, the first switch located in the primary circuit of the transformer, wherein the transformer is reset during the OFF period of the first switch by circuitry comprising:

a storage capacitor, a solid state switch in series with the storage capacitor, a drive circuit for the control input of the solid state switch thereby turning the solid state switch ON and OFF, and a connection from the transformer that provides an input signal to the drive circuit of the solid state switch, wherein the circuitry provides, when the first switch is OFF, a path to charge the storage capacitor, and then when the charge is complete a path whereby the storage capacitor discharges turning on the solid state switch which provides a path for discharging the capacitor via the transformer thereby resetting the transformer core, and when the first switch is turned ON, the solid state switch is OFF, the storage capacitor continues to discharge, and wherein the solid state switch is turned ON after the first switch is turned OFF, and the solid state switch is turned OFF after the first switch is turned ON.

2. The circuitry as defined in claim 1 wherein the first switch is a field effect transistor, and the solid state switch is a field effect transistor or a bipolar transistor.

3. The circuitry as defined in claim 1 wherein the drive circuit comprises a second solid state switch that accepts the signal from the transformer and provides a signal that drives the solid state switch.

4. The circuitry as defined in claim 1 further comprising a secondary winding from the transformer wherein the driving signal for the drive circuit of the solid state switch emanates from the secondary winding.

* * * * *

UNITED STATES PATENT AND TRADEMARK OFFICE
CERTIFICATE OF CORRECTION

PATENT NO.      : 6,452,818 B1
DATED           : September 17, 2002
INVENTOR(S)     : Anastasios V. Simopoulos It is certified that error appears in the above-identified patent and that said Letters Patent is hereby corrected as shown below:

<u>Title page,</u>
Item [75], inventor's name, replace "A." with -- V. --.

Signed and Sealed this

Twenty-fifth Day of February, 2003

JAMES E. ROGAN
*Director of the United States Patent and Trademark Office*